Patented Jan. 10, 1933

1,893,557

UNITED STATES PATENT OFFICE

HANS KRZIKALLA, OF MANNHEIM, GERMANY, ASSIGNOR TO GENERAL ANILINE WORKS, INC., OF NEW YORK, N. Y., A CORPORATION OF DELAWARE

METAL COMPOUNDS OF AN O-HYDROXYAZO DYESTUFF

No Drawing. Application filed November 20, 1928, Serial No. 320,752, and in Germany November 29, 1927.

The present invention relates to complex metal compounds of the o-hydroxyazo dyestuff from diazotized picramic acid and 1.3-phenylenediamine-4-sulfonic acid.

I have found that dyestuffs particularly suitable for dyeing wool or leather very fast brown to violet brown shades, are obtained by treating the o-hydroxyazo dyestuff of the formula:

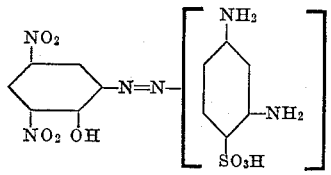

which is obtainable by coupling diazotized picramic acid with 1.3-phenylenediamine-4-sulfonic acid, with chromium or copper compounds.

The treatment may be carried out for instance by boiling or heating the said dyestuff with chromium or copper compounds at ordinary or elevated pressure.

The following example will further illustrate the nature of the said invention which however is not limited thereto. The parts are by weight.

Example

About 40 parts of the azo dyestuff obtainable from diazotized picramic acid and 1.3-phenylenediamine-4-sulfonic acid are stirred and heated to 120° centigrade for 3 hours in an autoclave with a solution containing 9.1 parts of chromium oxid ($Cr_2O_3$) and 14 parts of 85 per cent formic acid in 600 parts of water. The resulting dyestuff gives violet brown dyeings which are very fast to light, on leather. The dyeings on wool are of deeper brown shades and do not change in tone in washing and milling.

What I claim is:—

1. As new articles of manufacture the complex compounds of a metal selected from the group consisting of chromium and copper, of the o-hydroxyazo dyestuff of the formula:

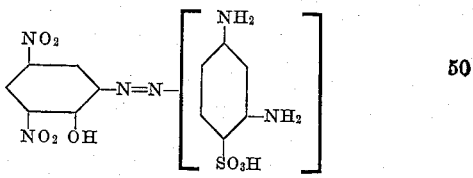

which is obtained by coupling diazotized picramic acid with 1.3-phenylenediamine-4-sulfonic acid, said complex compounds dyeing leather and wool very fast brown to violet brown shades.

2. As a new article of manufacture the complex chromium compound of the o-hydroxyazo dyestuff of the formula:

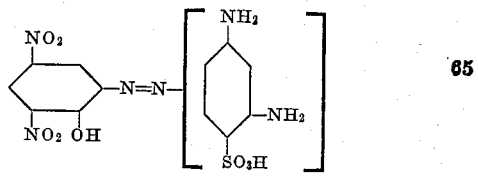

which is obtained by coupling diazotized picramic acid with 1.3-phenylenediamine-4-sulfonic acid, which complex compound dyes leather and wool very fast brown to violet brown shades.

In testimony whereof I have hereunto set my hand.

HANS KRZIKALLA.